United States Patent [19]

Horton et al.

[11] Patent Number: 5,111,867
[45] Date of Patent: May 12, 1992

[54] HEAVY CURTAIN SUPPORT ROLLER DEVICE

[75] Inventors: Terry F. Horton, Whittier; Steve A. Ross, Montclair, both of Calif.

[73] Assignee: Utility Trailer Manufacturing Co., City of Industry, Calif.

[21] Appl. No.: 867,799

[22] Filed: May 23, 1986

[51] Int. Cl.$^5$ ............................................. A47H 15/00
[52] U.S. Cl. ................................. 160/330; 16/87.6 R
[58] Field of Search ............. 160/330, 340, 341, 345, 160/346, 347, 123, 124, 125, 126; 16/87.6 R, 87.8, 98

[56] References Cited

U.S. PATENT DOCUMENTS

| | | | |
|---|---|---|---|
| 1,855,037 | 4/1932 | Vroom | 160/126 |
| 1,857,768 | 5/1932 | Reubel | 160/346 |
| 2,658,572 | 11/1953 | Vallen | 160/346 |
| 3,023,450 | 3/1962 | Renner et al. | 16/87.6 R |
| 3,044,104 | 7/1962 | Walz | 16/87.6 R |
| 3,392,420 | 7/1968 | Kless | 160/346 X |
| 3,709,552 | 1/1973 | Broadbent | 160/330 X |
| 4,126,921 | 11/1978 | Pape et al. | 160/330 X |
| 4,240,178 | 12/1980 | Miki | 160/345 X |
| 4,545,611 | 10/1985 | Broadbent | 296/155 X |

Primary Examiner—David M. Purol
Attorney, Agent, or Firm—Lyon & Lyon

[57] ABSTRACT

A support roller device for heavy curtains of the type used on curtain-sided cargo carrying vehicles wherein the roller has a pair of spaced wheels for engaging rails of a track member that has a downwardly opened slot between the rails. A guide block with longitudinally spaced flanges of a low friction material is positioned in the track slot and is only slightly narrower than the track slot to guide the device and roller along the track. The guide block is a separate member mounted on a metal hanger from the roller in one embodiment and is formed as an integral part of the hanger in a second embodiment.

2 Claims, 2 Drawing Sheets

Microfiche Appendix Included
(051115798 Microfiche, Purol; David M. Pages)

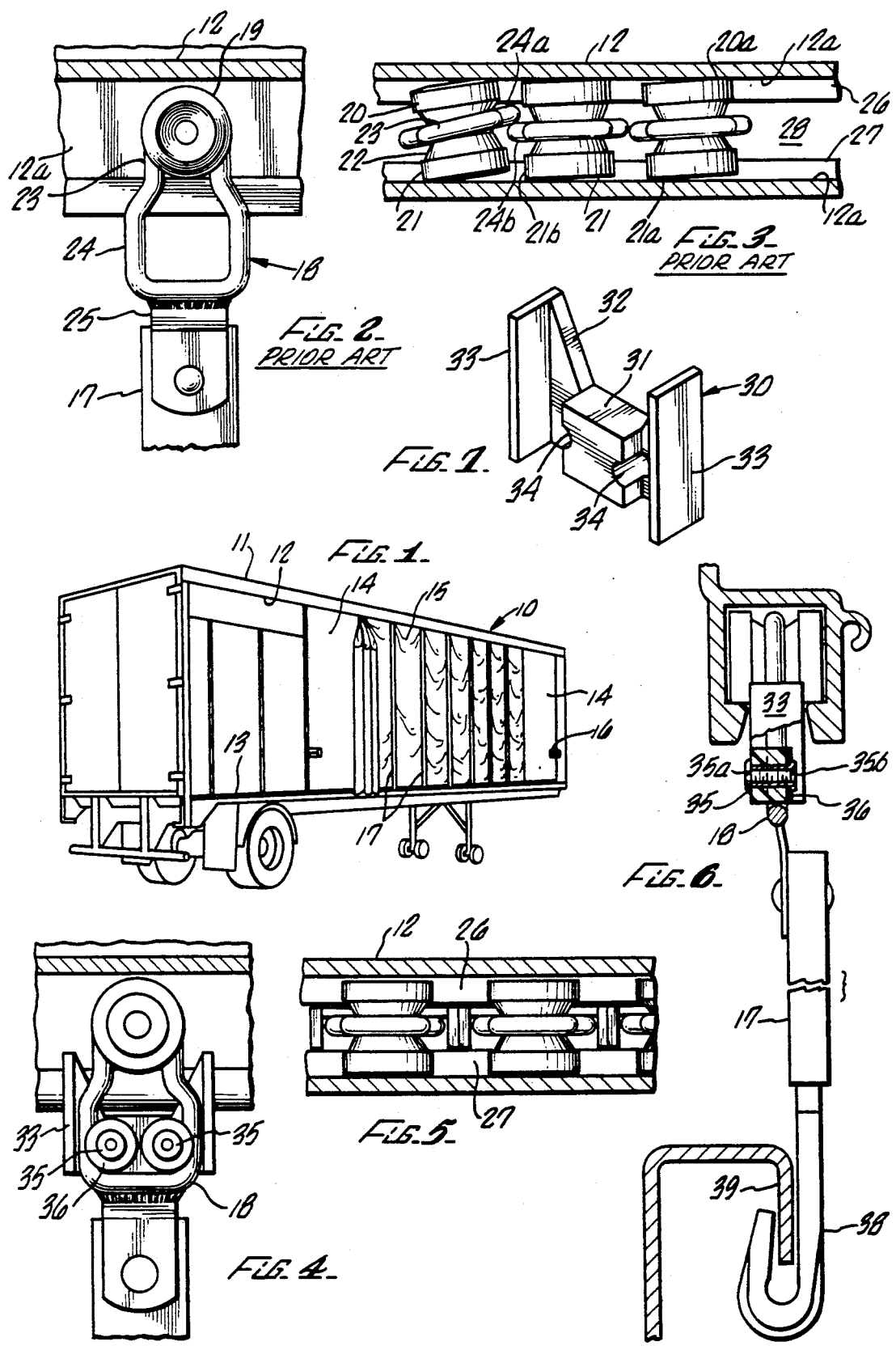

HEAVY CURTAIN SUPPORT ROLLER DEVICE

This invention relates to roller devices for supporting a heavy curtain from a track for improving the ability to open and close the curtain and, in particular, is directed to roller devices for use on curtain-sided cargo vehicles such as trucks and trailers.

An increasing number of cargo vehicles such as trucks, trailers and railway cars are being constructed with a roof, front and rear walls, and open sides for convenient loading and unloading of the cargo anywhere along the length of the vehicle. The sides are closed during transit by heavy curtains suspended from rollers in a track along the roof line extending the length of the side opening. One such curtain-sided vehicle is shown in U.S. Pat. No. 3,709,552 wherein the longitudinal ends of the curtain are provided with vertical poles for attaching the ends of the curtain to the end walls of the vehicle and vertical straps are spaced along the curtain for securing the curtain to the side of the bed of the vehicle. Another form of curtain-sided vehicle is shown in U.S. Pat. No. 4,545,611 in which the curtain is provided with a sliding door panel at each end rather than a pole and vertical bars spaced along the curtain rather than straps for holding the curtain in position. Both of these conventional curtain-sided vehicles employ a multiplicity of rollers in the roof mounted track with hangers extending downwardly from the rollers to support the curtains and the vertical straps or rods are connected to those hangers. Because the curtains must withstand extreme weather conditions and wind, they are rather heavy. Further, because the operator normally attempts to push the curtains from one end toward the opened position, the curtain tends to gather and become difficulty to push whereby the operator must then move towards the closed end of the curtain and attempt to pull on the side of the curtain. This is both awkward and time consuming.

Moreover, it has been found, as will be described in greater detail below with respect to the prior art arrangements shown in FIGS. 2 and 3, the supporting roller devices in the heretofore conventional curtain-sided vehicles tend to engage one another as the curtain gathers and also to become partially jammed in the overhead track to provide still further resistance to attempting to open the curtain by pushing on the open end.

Thus, the principle object of the present invention is to provide an improved form of support roller device for heavy curtains in which the position of the roller in the track is properly guided to prevent jamming or undue increases in friction between the roller and the track. A still further object is to provide such a device wherein adjacent rollers are properly spaced and separated to avoid friction or jamming between rollers. Still another object of this invention is to provide a novel construction for such a device whereby the heretofore conventional support roller devices can be modified to incorporate such advantages.

Two different embodiments of the present invention will be described in connection with one form of conventional curtain-sided vehicle but it will readily appear to those skilled in the art that the invention is equally applicable to other embodiments and curtain-sided vehicles. Reference will now be made to the drawings wherein:

FIG. 1 is a perspective view of a typical curtain-sided vehicle of the type shown and described in U.S. Pat. No. 4,545,611 having sliding door members attached to each end of the curtain.

FIG. 2 is an enlarged fragmentary side elevation view of a typical prior art support roller device in an overhead rail with one-half of the rail broken away for clarity of illustration.

FIG. 3 is a top plan view of a plurality of prior art support roller devices in the overhead track, with the upper portion of the track broken away for illustrating the rollers, in which the support roller devices are in interfering engagement with each other du opening and gathering of the curtain.

FIG. 4 is a side elevation view similar to FIG. 2 and illustrating the conventional support roller device with the guide means improvement of this invention mounted thereon.

FIG. 5 top plan view similar to FIG. 3 illustrating a plurality the support roller devices of FIG. 4 in the overhead track in the guided condition during pushing the curtain to open and gather the curtains.

FIG. 6 is an end elevation view of the support roller device of FIGS. 4 and 5 together with the vertical rod that retains the curtain for the type of curtain-sided vehicle shown in FIG. 1 but with that rod substantially foreshortened.

FIG. 7 is a perspective view of the guide means that is shown installed on the support roller devices of FIGS. 4 through 6.

Figure 8:
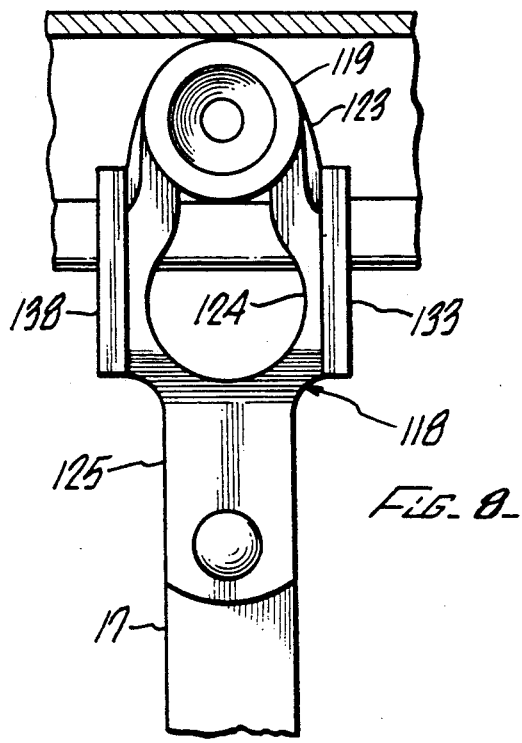

FIG. 8 is a side elevation view of a second embodiment of the support roller device of this invention positioned in the overhead track similar to FIGS. 2 and 4.

Figure 9:
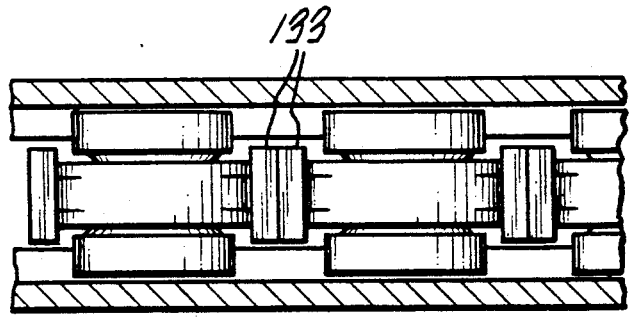

FIG. 9 is a top plan view similar to FIGS. 3 and 5 but illustrating the second embodiment of this invention shown in FIG. 8.

Figure 10:
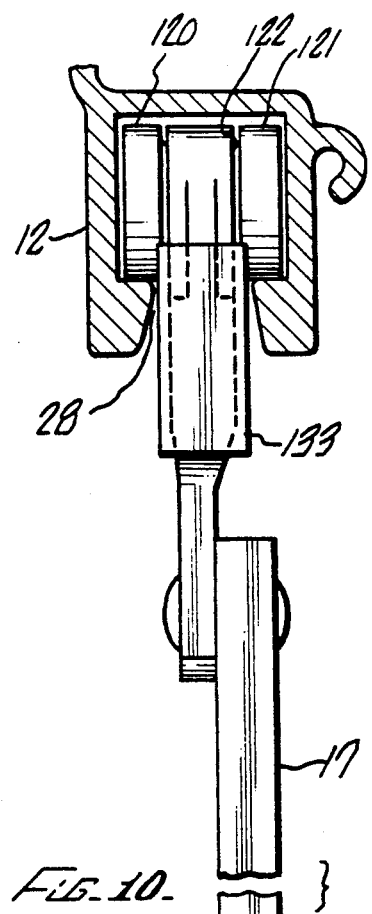

FIG. 10 is an end elevation view similar to FIG. 6 illustrating the second embodiment of this invention shown in FIGS. 8 and 9.

Referring now to FIG. 1, a trailer type cargo vehicle, generally designated 10, of the type shown and described in U.S. Pat. No. 4,545,611 is illustrated but it will readily appear to those skilled in the art that the hereinafter described invention will be equally applicable to trucks, railway cars, or other cargo vehicles and to the type of curtain-sided vehicle shown in U.S. Pat. No. 3,709,552 as well as other types of uses for heavy curtains suspended from rollers. The vehicle 10 includes a roof 11 supporting the rail 12 extending the length of the open side of the vehicle 10 and a frame and bed 13 for supporting the cargo. A short section of door 14 is connected to each end of the curtain 15 and slidably suspended from the track 12 to form the end closure for the curtain. Each door has a latch member 16 to connect to the vertical post at the end of the open side of the vehicle 10 in such a manner as to horizontally tension the curtain 15 in the closed position. Horizontally spaced along the curtain 15 are vertical rods 17 which may be secured directly to the surface of the flexible curtain or positioned in sleeves formed in the curtain. The top of each rod 17 is suspended from a support roller device and the bottom of the rod 17 engages a rail to confine the rod, which will hereinafter be described more fully. The details of the typical construction and operation of the curtain-sided vehicle illustrated in FIG. 1 are set forth in U.S. Pat. No. 4,545,611, the specification and drawings of which are incorporated here by reference.

The conventional vehicle 10 illustrated in FIG. 1 includes support roller devices, generally designated 18, of the type illustrated in FIGS. 2 and 3. Each device 18 has a roller 19 with two spaced wheel portions 20 and 21 joined by a central portion 22 of a small diameter. Thus, the roller 19 is spool shaped and the center has a circular cross section which is engaged by a loop portion 23 of a hanger 24 formed of round metal rod. The lower portion of the device 18 has a metal strap 25 mounted to the metal rod 24 and extends downwardly for connecting to the vertical rod 17 that supports the curtain 15. The two wheel portions 20 and 21 of each roller 19 engage rail portions 26 and 27, respectively, of the overhead track 12 for supporting the roller 19. Between the rail portions 26 and 27 is a downwardly open slot 28 in the rail 12 through which the intermediate portion of hanger 24 of the roller support device 18 extends. Thus, the curtain 15 may be moved along the side of the vehicle 10 by the rollers 19 rolling along the rail 26 and 27 of the track 12.

However, it has been found that as one attempts to open the side of the vehicle by pushing one or the other of the doors 14 therealong to collapse the flexible curtain 15 that the opening movement becomes increasingly more difficult and further it has been found that a substantial cause of this difficulty results from an interengagement among the adjacent support roller devices 18 and their engagement with the sides of the track 12. Specifically, referring to FIG. 3 for illustrative purposes, since the rollers 19 are being pushed along the track 12 and are somewhat free to pivot or "caster" because the loop portion 23 is loosely fitted to the wheel and the intermediate portion of the hanger 24 can twist about a vertical axis, the outer peripheral edges 20a and 21a of the wheel portions 20 and 21, respectively, tend to engage the vertical side surfaces 12a of the track 12 thereby developing friction to resist the rolling movement of the rollers 19. Further, the twisting about a vertical axis by the hanger portions of the support roller devices allow one intermediate portion 24a of one device to overlap another intermediate portion 24b of the next adjacent support device to cause further twisting thereof and more severe engagement of the wheel peripheries 20a and 21a with the side surfaces 12a of the track 12. Still further, the hanger portions 24 may twist a sufficient degree to engage the side edges of the rails 26 and 27 in gap 28. Lastly, the wheel portions 20 and 21 of adjacent rollers may become engaged, as at 21b in FIG. 3, if two adjacent devices 18 overlap excessively to create still further friction inhibiting the rolling movement of the rollers. Each of these factors tend to increase the force required to push the curtain toward the open position in the prior conventional systems thereby requiring the operator to move to a position along the side of the vehicle and pull on the curtain rather than continuing to push on the door 14. These friction creating factors are eliminated by the present invention.

Referring now to the embodiment of the present invention shown in FIGS. 4 through 7, it is to be noted that the basic support roller device 18 is identical to that shown in FIGS. 2 and 3 and described above but that a guide means, generally designated 30, is mounted on the device 18 for correcting the deficiencies of the prior art device. Thus, the details of the construction of the support roller device 18 will not be repeated here. The guide means 30 is preferably an integral cast block of a low coefficient of friction material such as nylon, teflon or the like. The guide means 30 includes a central block portion 31 adapted to fit into the open center of the intermediate portion of the metal rod hanger 24. Plate portions 32 extend longitudinally and upwardly in both directions from one side of the block 31 and have lateral flange portions 33 extending therefrom that fit on the longitudinal outer sides of the intermediate portion of the hanger 24. A pair of spaced holes 34 are provided in the guide means 30 through the block portion 31 for receiving a pair of fasteners 35. The fasteners 35 are preferably comprised of a threaded screw 35a and an internally threaded bushing 35b having a flange thereon whereby the bushing 35b may be inserted through the hole 34 and threadedly engaged by the screw 35. A washer 36 is sufficiently large to overlap the round rod of the intermediate portion of the hanger 24 to mount the guide means 30 to the intermediate portion 24. It is to be noted that the guide means 30 may be installed on the conventional support roller device 18 without removing same from the track 12.

The upper portions of the flanges 33 and plates 32 extend into the slot 28 between the rails 26 and 27 of the track 12 as shown in FIGS. 4, 5 and 6. The flanges 33 are slightly narrower than the slot 28 for free movement of the flanges 33 along the slot but even the slightest lateral movement of the device 18 will cause sliding engagement between one or both of the flanges 33 and one or the other of the edges of the rail portions 26 and 27. Since the guide means 30, including the flanges 33, are of a low friction material, this interengagement serves to guide the support roller device along the track 12 without appreciable resistance. Further, the flanges 33 of each guide means 30 are longitudinally spaced a substantial distance whereby only infinitesimal twisting about a vertical axis of the support roller device 18 is permitted and therefore the wheel portions 20 and 21 of the roller 19 are not permitted to caster and engage the vertical side surfaces 12a of the track 12. Still further, it is to be noted that the flanges 33 of each guide means 30 extend longitudinally beyond the roller 19 and metal rod hanger 24 of the support roller device 18 to engage the like flange portions 33 of the next adjacent guide means 30, as best shown in FIG. 5, thereby positively spacing the adjacent support roller devices. Thus, as the door 14 is pushed along the track 12 the curtain 15 gathers in pleats with the vertical rods 17 and the support roller devices 18 uniformly spaced and guided by the guide blocks 30 thereby greatly reducing the friction and jamming that otherwise tends to resist the movement of the curtain and rollers along the track.

Referring to FIG. 6, the vertical rod 17 suspended from each support roller device 18 has a hook member 38 attached to the lower end thereof which partially encircles and slidably engages a downwardly facing flange 39 on a side member of the vehicle frame and bed 13. This prevents outward movement of the curtain 15 during transit or even during windy conditions when the curtain is opened.

Turning now to the second embodiment shown in FIGS. 8, 9 and 10, the support roller device, generally designated 118, is an integral unit formed of a material having a low coefficient of friction such as nylon, teflon or the like. The device 118 has a loop shaped upper portion 123, an open intermediate portion 124, and a lower portion 125 to which the vertical rod 17 is attached. A roller 119 which may be substantially similar to a previously described roller 19 is adapted to fit through the open intermediate portion 124 and move upwardly into engagement with the loop portion 123 for rotatably supporting the device 118. The roller 119 has two spaced wheel portions 120 and 121 with a central portion 122 of reduced diameter for positioning within the looped portion 123. Vertically extending flanges 133 on each longitudinal end of the device 118 are of a width slightly less than the width of the slot 28 in the track 12 for guiding the roller support device 118 along the track in the same manner the guide block means 30 functions in the first described embodiment. Again, the flanges 133 of adjacent support roller devices 118 are adapted to engage each other, as shown in FIG. 9, to properly space the devices 118. Thus, the one piece construction of device 118 performs the same functions as the two piece construction of the device 18 comprising metal rod hanger 24 and guide block means 30 of the first embodiment with the flanges 133 performing the same guiding and separating functions as the flanges 33 of the first embodiment.

Having fully described the invention in connection with two different embodiments and as applied to one type of previously conventional curtain-sided vehicle, it is to be understood and will readily appear to those skilled in the art that the present invention is equally applicable to other embodiments and forms without departing from the scope of the appended claims.

What is claimed:

1. A support roller device for use with like support roller devices spaced along and supporting a heavy curtain of substantial length on an open side of a cargo vehicle from a track extending the length of the open side and along the vehicle roof wherein the track has two upwardly facing rails spaced apart with facing edges defining a slot therebetween, each roller device comprising, a roller having two spaced wheel portions for engaging the two upwardly facing rails, respectively, and a central portion, said roller central portion having a circular cross section of a diameter smaller than the wheel portions, a hanger means having a loop portion with a semicircular inside diameter slightly larger than said roller central portion circular cross section for being rotatably supported thereon, said hanger means having a lower portion for connecting to and supporting the heavy curtain, the hanger means having an intermediate portion between said loop portion and lower portion positioned in the track slot, said intermediate portion including guide means of a low friction material for slidably engaging said track rail edges defining the slot, said guide means of substantially the same width as the slot, and said guide means extending longitudinally of the slot beyond the longitudinally extent of the roller wheels and all other portions of the hanger means for engaging, spacing and separating adjacent support roller devices, wherein said hanger means is an integral unit formed of low friction material and wherein said intermediate portion of said hanger means has a semicircular area connected to said loop portion of said hanger means and adapted to allow said roller to fit through the semi-circular area of said hanger means and to allow said roller means to move upwardly into engagement with said loop portion for rotatably supporting said hanger means.

2. A support roller device for supporting a heavy curtain from an overhead track having a slot between two roller rails, comprising a roller having two spaced wheel portions for engaging the roller rails and a central portion therebetween, curtain support means engaging said central portion of and rotatably connected to said roller, and said curtain support means having guide means positioned in the track slot for slidably engaging edges of the two roller rails for causing guided rolling movement of the roller along the track, said curtain support means is comprised of an integral unit of low friction material with an upper loop portion for rotatably connecting to the roller central portion and an intermediate area having a block portion comprising said guide means and a semicircular intermediate area connected to said loop portion for allowing said roller to fit through said intermediate area and move upwardly to engagement with said loop portion for rotatably supporting said curtain support means.

* * * * *